(12) United States Patent
Munir et al.

(10) Patent No.: US 12,230,039 B2
(45) Date of Patent: Feb. 18, 2025

(54) SYSTEMS AND METHODS FOR DETECTING SYMPTOMS OF OCCUPANT ILLNESS

(71) Applicant: Robert Bosch GmbH, Stuttgart (DE)

(72) Inventors: Sirajum Munir, Pittsburgh, PA (US); Samarjit Das, Sewickley, PA (US); Yunze Zeng, San Jose, CA (US); Vivek Jain, Sunnyvale, CA (US)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 18/385,598

(22) Filed: Oct. 31, 2023

(65) Prior Publication Data
US 2024/0062558 A1 Feb. 22, 2024

Related U.S. Application Data

(63) Continuation of application No. 17/078,235, filed on Oct. 23, 2020, now Pat. No. 11,854,275.

(51) Int. Cl.
*G06V 20/52* (2022.01)
*G01S 13/46* (2006.01)
(Continued)

(52) U.S. Cl.
CPC ............ *G06V 20/597* (2022.01); *G01S 13/46* (2013.01); *G06F 18/24* (2023.01); *G06F 18/25* (2023.01);
(Continued)

(58) Field of Classification Search
CPC ...... G06V 20/597; G06V 40/20; G01S 13/46; G06F 18/24; G06F 18/25; G06N 3/08;
(Continued)

(56) References Cited

U.S. PATENT DOCUMENTS 7,447,333 B1  11/2008  Masticola et al.
8,936,944 B2  1/2015  Peltz et al.
(Continued)

OTHER PUBLICATIONS

Rezaei, Mahdi, and Mohsen Azarmi. "Deepsocial: Social distancing monitoring and infection risk assessment in covid-19 pandemic." Applied Sciences 10.21 (2020): 7514. (Year: 2020).*
(Continued)

*Primary Examiner* — Amandeep Saini
*Assistant Examiner* — Denise G Alfonso
(74) *Attorney, Agent, or Firm* — Dickinson Wright PLLC

(57) ABSTRACT

Systems and methods for detecting symptoms of occupant illness is disclosed herein. In embodiments, a storage is configured to maintain a visualization application and data from one or more sources, such as an image source. A processor is in communication with the storage and a user interface. The processor is programmed to receive data from the one or more sources, execute human-detection models based on the received data, execute activity-recognition models to recognize symptoms of illness based on the data from the one or more sources, determine a location of the recognized symptoms, and execute a visualization application to display information in the user interface. The visualization application can show a background image with an overlaid image that includes an indicator for each location of recognized symptom of illness. Additionally, data from the audio source, image source, and/or radar source can be fused.

18 Claims, 12 Drawing Sheets

(51) Int. Cl.
| | |
|---|---|
| *G06F 18/24* | (2023.01) |
| *G06F 18/25* | (2023.01) |
| *G06N 3/08* | (2023.01) |
| *G06T 7/194* | (2017.01) |
| *G06V 20/59* | (2022.01) |
| *G06V 40/20* | (2022.01) |

(52) U.S. Cl.
CPC .............. *G06N 3/08* (2013.01); *G06T 7/194* (2017.01); *G06V 40/20* (2022.01); *G01S 2013/468* (2013.01); *G06T 2207/30196* (2013.01); *G06T 2207/30268* (2013.01)

(58) Field of Classification Search
CPC ........... G06T 7/194; G06T 2207/30196; G06T 2207/30268
See application file for complete search history.

(56) References Cited

U.S. PATENT DOCUMENTS

| | | | |
|---|---|---|---|
| 10,219,750 B2 | 3/2019 | Duan et al. | |
| 2008/0279420 A1* | 11/2008 | Masticola | A61B 7/003 382/128 |
| 2019/0328300 A1* | 10/2019 | Bozorgtabar | G06V 40/174 |
| 2020/0194115 A1 | 6/2020 | Chou | |
| 2021/0390807 A1* | 12/2021 | Chaurasia | G07C 9/27 |
| 2022/0037029 A1 | 2/2022 | Wu et al. | |

OTHER PUBLICATIONS

Rezaei, Mahdi, and Mohsen Azarmi. "DeepSOCIAL: Social Distancing Monitoring and Infection Risk Assessment in COVID-19 Pandemic." arXiv preprint arXiv:2008.11672 (2020). (Year: 2020).*
Brandstein, Michael S., and Harvey F. Silverman. "A practical methodology for speech source localization with microphone arrays." Computer Speech & Language 11.2 (1997): 91-126, 36 pages.
Aytar, Yusuf, Carl Vondrick, and Antonio Torralba. "Soundnet: Learning sound representations from unlabeled video." Advances in neural information processing systems. 2016, 9 pages.
Matos, Sergio, et al. "Detection of cough signals in continuous audio recordings using hidden Markov models." IEEE Transactions on Biomedical Engineering 53.6 (2006): 1078-1083, 6 pages.
Monge-Álvarez, Jesús, et al. "Robust detection of audio-cough events using local hu moments." IEEE journal of biomedical and health informatics 23.1 (2018): 184-196, 13 pages.
Sun, Zheng, et al. "Coughloc: Location-aware indoor acoustic sensing for non-intrusive cough detection." International Workshop on Emerging Mobile Sensing Technologies, Systems, and Applications. 2011, 6 pages.
Sun, Xiao, et al. "SymDetector: detecting sound-related respiratory symptoms using smartphones." Proceedings of the 2015 ACM International Joint Conference on Pervasive and Ubiquitous Computing. 2015, 12 pages.
Nemati, Ebrahim, et al. "Private audio-based cough sensing for in-home pulmonary assessment using mobile devices." EAI International Conference on Body Area Networks. Springer, Cham, 2018, 12 pages.
Al-Azzoa, Fadwa, Arwa Mohammed Taqia, and Mariofanna Milanovab. "Human Related-Health Actions Detection using Android Camera based on TensorFlow Object Detection API." International Journal of Advanced Computer Science and Applications 9.10 (2018): 9-23, 15 pages.
You Only Look Once: Unified, Real-Time Object Detection. Joseph Redmon, Santosh Divvala, Ross Girshick, Ali Farhadi. https://arxiv.org/abs/1506.02640, 10 pages.
SSD: Single Shot MultiBox Detector. Wei Liu, Dragomir Anguelov, Dumitru Erhan, Christian Szegedy, Scott Reed, Cheng-Yang Fu, Alexander C. Berg. https://arxiv.org/abs/1512.02325, 17 pages.
Faster R-CNN: Towards Real-Time Object Detection with Region Proposal Networks. Shaoqing Ren, Kaiming He, Ross Girshick, Jian Sun. https://arxiv.org/abs/1506.01497, 14 pages.
Carreira, Joao, and Andrew Zisserman. "Quo vadis, action recognition? a new model and the kinetics dataset." proceedings of the IEEE Conference on Computer Vision and Pattern Recognition. 2017, 10 pages.
Simonyan, Karen, and Andrew Zisserman. "Very deep convolutional networks for large-scale image recognition." arXiv preprint arXiv:1409.1556 (2014), 14 pages.
He, Kaiming, et al. "Deep residual learning for image recognition." Proceedings of the IEEE conference on computer vision and pattern recognition. 2016, 12 pages.
Thi, Tuan Hue, et al. "Recognizing flu-like symptoms from videos." BMC bioinformatics 15.1 (2014): 300, 10 pages.
Amos, Brandon, Bartosz Ludwiczuk, and Mahadev Satyanarayanan. "Openface: A general-purpose face recognition library with mobile applications." CMU School of Computer Science 6 (2016): 2, 20 pages.
Taigman, Yaniv, et al. "Deepface: Closing the gap to human-level performance in face verification." Proceedings of the IEEE conference on computer vision and pattern recognition. 2014, 8 pages.
Zadeh, Amir, et al. "Multi-attention recurrent network for human communication comprehension." Thirty-Second AAAI Conference on Artificial Intelligence. 2018, 9 pages.
Zhicheng Yang, Maurizio Bocca, Vivek Jain, Prasant Mohapatra, "Contactless Breathing Rate Monitoring in Vehicle Using UWB Radar," 7th Intl. Workshop on Real-World Embedded Wireless Systems and Networks (RealWsN), ACM Sensys Workshop, Nov. 2018, 6 pages.
Yunze Zeng, Parth H Pathak, Zhicheng Yang, Prasant Mohapatra, "Human tracking and activity monitoring using 60 GHz mmWave," 15th ACM/IEEE International Conference on Information Processing in Sensor Networks (IPSN), Apr. 2016, 2 pages.
Zhicheng Yang, Parth H Pathak, Yunze Zeng, Xixi Liran, Prasant Mohapatra, "Monitoring vital signs using millimeter wave," 17th ACM Intl. Symposium on Mobile Ad Hoc Networking and Computing (MobiHoc), Jul. 2016, 10 pages.
Vital-Radio: Smart Homes that Monitor Breathing and Heart Rate: http://witrack.csail.mit.edu/vitalradio/, 10 pages.
Liang Liu, Mihail Popescu, Marjorie Skubic, Marilyn Rantz, and Paul Cuddihy, "An automatic in-home fall detection system using Doppler radar signatures," Journal of Ambient Intelligence and Smart Environments, pp. 453-46, Jul. 2016, 14 pages.
Al Hossain, Forsad, et al. "FluSense: a contactless syndromic surveillance platform for influenza-like illness in hospital waiting areas." Proceedings of the ACM on Interactive, Mobile, Wearable and Ubiquitous Technologies 4.1 (2020): 28 pages.
Wei Dai, Chia Dai, Shuhui Qu, Juncheng Li, Samarjit Das, "Very deep convolutional neural networks for raw waveforms", IEEE International Conference on Acoustics, Speech and Signal Processing (ICASSP), 2017, 5 pages.
Yunze Zeng, Parth H Pathak, Prasant Mohapatra, "WiWho: wifi-based person identification in smart spaces," 15th ACM/IEEE International Conference on Information Processing in Sensor Networks (IPSN), 2016, 12 pages.
Thomas Drugman, Yannis Stylianou, Yusuke Kida, Masami Akamine, "Voice activity detection: Merging source and filter-based information", IEEE Signal Processing Letters, vol. 23, issue 2, pp. 252-256, 2017, 5 pages.
P. Stoica and A. Nehorai, "MUSIC, maximum likelihood, and the Cramer-Rao lower bound," IEEE Trans. on Acustic Speech and Signal Processing, vol. ASSP-37, pp. 720-743, a 1989, 22 pages.
Narayanan et al., "A Multifrequency Radar System for Detecting Humans and Characterizing Human Activities for Short-Range Through-Wall and Long-Range Foliage Penetration Applications", International Journal of Microwave Science and Technology vol. 2014, Article ID 958905, http://dx.doi.org/10.1155/2014/958905, 22 pages.
Zhicheng Yang et al., "Vital Sign and Sleep Monitoring Using Millimeter Wave." AMC Transaction on Sensor Networks Apr. 2017, vol. 13, No. 2, 32 pages.

(56) References Cited

OTHER PUBLICATIONS

Mahdi Rezaei e tal., "DeepSOCIAL: Social Distancing Monitoring and Infection Risk Assessment in COVID-19 Pandemic." arXiv:2008.11672v1 [cs.CV] Aug. 26, 2020, 18 Pages.

* cited by examiner

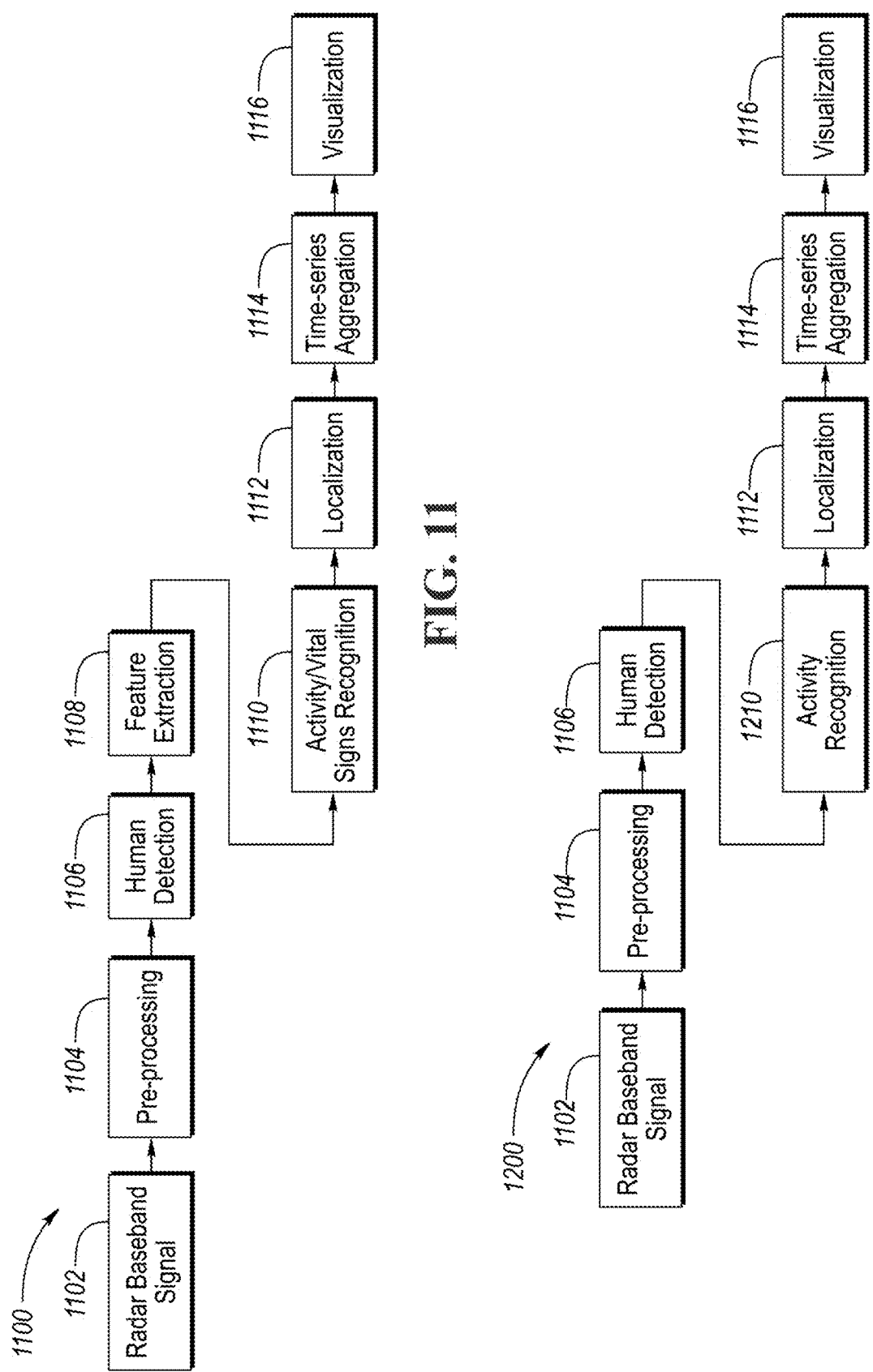

SYSTEMS AND METHODS FOR DETECTING SYMPTOMS OF OCCUPANT ILLNESS

CROSS-REFERENCE TO RELATED APPLICATION

This application is a continuation of U.S. application Ser. No. 17/078,235 filed Oct. 23, 2020, the entire disclosure of which is incorporated by reference herein.

TECHNICAL FIELD

The present disclosure relates to systems and methods for detecting symptoms of occupant illness. In some embodiments, the systems and methods can detect symptoms of illness of persons in public or crowded places, or shared mobility such as public transportation or ride sharing.

BACKGROUND

Infectious diseases can spread more easily in crowded places, such as restaurants, arenas, public buildings, and the like. This is also true with shared-mobility services, such as busses, trains, cabs, and ride-hailing and ride-sharing services. Current technologies do not adequately provide information regarding cleanliness to the owners and/or occupants of such places and services. If service providers or occupants were equipped with knowledge regarding the potential illness of occupants, better decisions could be made to help curb the spread of infectious diseases.

SUMMARY

In an embodiment, a system for detecting symptoms of occupant illness is provided. The system includes a user interface, storage configured to maintain a visualization application and image data from an image source, and a processor. The processor is in communication with the storage and the user interface. The processor is programmed to receive the image data from the image source, the image data including a background image associated with an area that occupants are occupying. The processor is further programmed to execute a human-detection model configured to detect the occupants within the image data, execute an activity-recognition model configured to recognize image-based symptoms of illness in the detected occupants within the image data based on movements of the detected occupants, determine a location of the recognized symptoms of illness utilizing the image data from the image source, and execute the visualization application to display in the user interface an overlaid image overlaid onto the background image. The overlaid image includes, for each location of recognized symptoms of illness, an indicator displaying information that the recognized symptoms of illness occurred at that location.

BRIEF DESCRIPTION OF THE DRAWINGS

FIG. 11 illustrates a flow chart for detecting and displaying symptoms of occupant illness based on radar data, according to an embodiment.

FIG. 12 illustrates a flow chart for detecting and displaying symptoms of occupant illness based on radar data, according to another embodiment.

DETAILED DESCRIPTION

Figure 1:
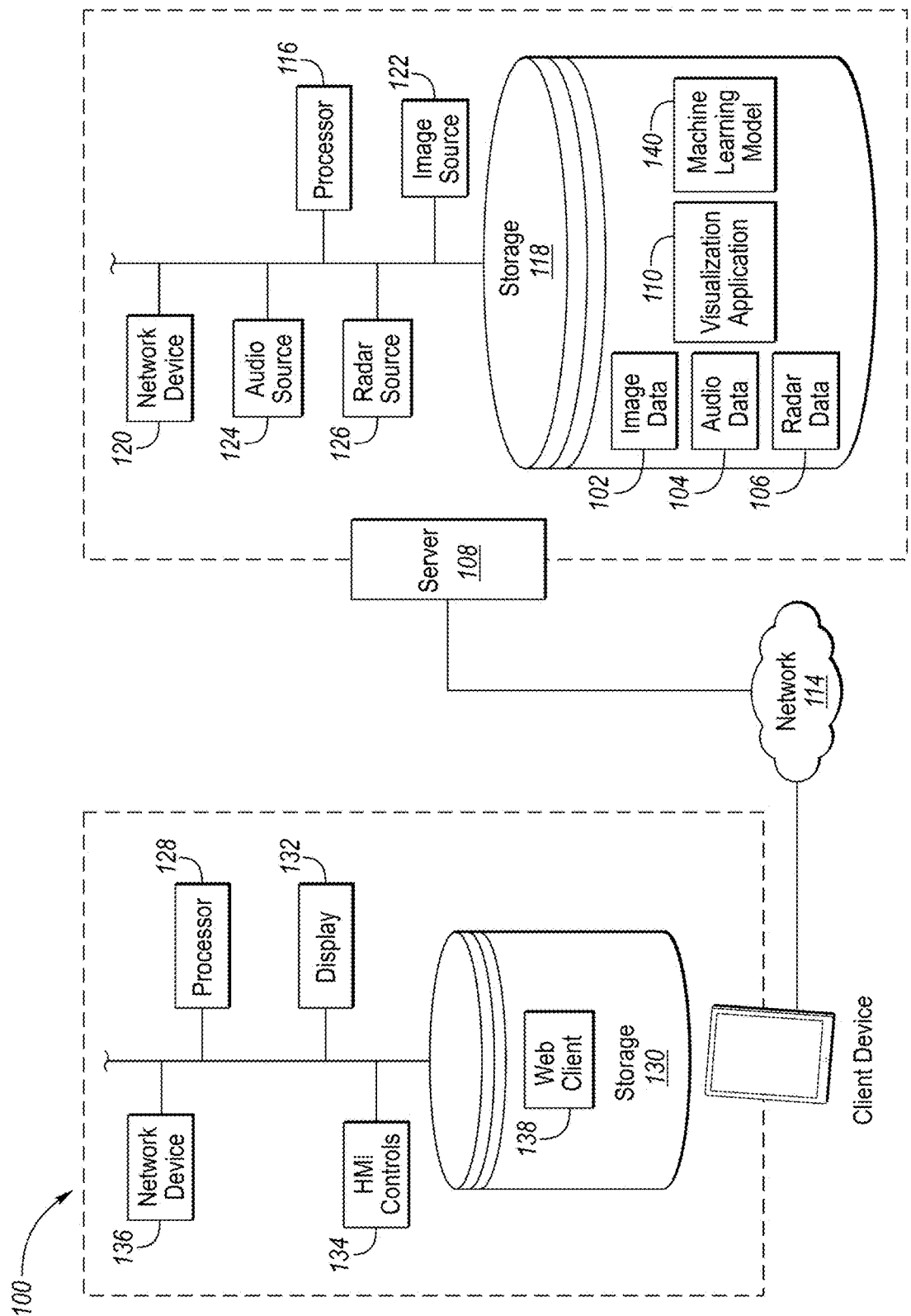
FIG. 1 illustrates an example of a system for detecting symptoms of occupant illness, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

People are increasingly relying on shared-mobility services, such as busses, trains, cabs, and ride-hailing services such as UBER and LYFT. In these shared-mobility services, common spaces are occupied by many different people at different times. As newer infection diseases spread, there is an increased risk of infection when sharing such common spaces. Current techniques do not provide adequate information to the riders to assess the cleanliness of a shared space. This disclosure proposes several novel techniques to assist occupants of shared-mobility services to make educated decisions based on activity of previous occupants indicating illness (such as coughing or sneezing incidents) as indicated by one or more of different types of sensors (such as audio sensors, video sensors, and/or radar sensors). If more than one different type of sensor is used to detect symptoms of potential illness of occupants, the sensor data may be fused.

In other embodiments, the sensors are used in other large, crowded environments such as restaurants, public buildings, concert venues, sporting events, and the like. The sensors may be used to detect symptoms of illnesses of the occupants of these places.

This disclosure also proposes providing such information to the provider (e.g., owner or manager) of a fleet of vehicles, such as a vehicle rental service. For example, one or more of the sensors described herein can be placed in each of the vehicles of the fleet, and can be used to detect symptoms of occupant illness within the vehicle, and communicate that information to the fleet provider. When the fleet provider is equipped with knowledge of a previous occupant potentially being ill due to detected signs of coughing, sneezing or the like, the fleet provider can disinfect such vehicle and inform co-occupants or subsequent occupants of about the possibility of infection. This information can also help city planners in general to know on which routes germs are spreading faster along with associated symptoms.

FIG. 1 illustrates an example system 100 for detecting symptoms of occupant illness and displaying the detected symptoms in a visualization. The system 100 can also be referred to detection and visualization system, as the system is configured, at least in part, to process images and determine certain characteristics or qualities of the image that represent occupant illness, and provide a visualization of the detected occupant illness so that occupants or other users can make informed decisions and actions. In other embodiments, the system utilizes audio or radio frequency (RF) to determine occupant illness. The illustrated system 100 is not only configured to detect the symptoms of occupant illness, but also configured to display information regarding the symptoms (e.g., image annotation or image overlaying) for acting on the data illustrating the detected or determined symptoms.

In one or more embodiments, the system 100 is configured for the capture of image data 102. In combination with the image data 102, or separate from the image data 102, the system 100 may be configured for the capture and processing of audio data 104, and/or radar data 106. The system 100 includes a server 108 that hosts a visualization application 110 that is accessible to one or more client devices 112 over a network 114. The server 108 includes a processor 116 that is operatively connected to a storage 118 and to a network device 120. The server 108 further includes an image data input source 122 for the receipt of the image data 102, operatively connected to the processor 116 and the storage 118. The server 108 may also include an audio data input source 124 for the receipt of the audio data 104, operatively connected to the processor 116 and the storage 118. The server 108 may also include a radar data input source 126 for the receipt of the radar data 106, operatively connected to the processor 116 and the storage 118. The client device 112 includes a processor 128 that is operatively connected to a storage 130, a display device 132, human-machine interface (HMI) controls 134, and a network device 136. The client device 112 may allow an operator to access a web client 138.

It should be noted that the example system 100 is one example, and other systems consisting of multiple units of 100 may be used. For instance, while only one client device 112 is shown, systems 100 including multiple client devices 112 are contemplated. As another possibility, while the example implementation is shown as a web-based application, alternate systems may be implemented as standalone systems, local systems, or as client-server systems with thick client software. Various components such as the image source 122, audio source 124, and radar source 126 and the associated data 102, 104, 106 may be received and processed locally at the client device side of the system 100 rather than the server 108.

Each of the processor 116 of the server 108 and the processor 128 of the client device 112 may include one or more integrated circuits that implement the functionality of a central processing unit (CPU) and/or graphics processing unit (GPU). In some examples, the processors 116, 128 are a system on a chip (SoC) that integrates the functionality of the CPU and GPU. The SoC may optionally include other components such as, for example, the storage 118 and the network device 120 or 136 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation, the processors 116, 128 execute stored program instructions that are retrieved from the storages 118, 130, respectively. The stored program instructions accordingly include software that controls the operation of the processors 116, 128 to perform the operations described herein. The storages 118, 130 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU of the client device 112 may include hardware and software for display of at least two-dimensional (2D) and optionally three-dimensional (3D) graphics to a display device 132 of the client device 112. The display device 132 may include an electronic display screen, projector, printer, or any other suitable device that reproduces a graphical display. In some examples, the processor 128 of the client device 112 executes software programs using the hardware functionality in the GPU to accelerate the performance of machine learning or other computing operations described herein.

The HMI controls 134 of the client device 112 may include any of various devices that enable the client device 112 of the system 100 to receive control input from workers, fleet vehicle managers, or other users. Examples of suitable input devices that receive human interface inputs may include keyboards, mice, trackballs, touchscreens, voice input devices, graphics tablets, and the like. As described herein, a user interface may include either or both of the display device 132 and HMI controls 134.

The network devices 120, 136 may each include any of various devices that enable the server 108 and client device 112, respectively, to send and/or receive data from external devices over the network 114. Examples of suitable network devices 120, 136 include a network adapter or peripheral interconnection device that receives data from another computer or external data storage device, which can be useful for receiving large sets of data in an efficient manner.

The visualization application 110 be an example of a software application executed by the server 108. When executed, the visualization application 110 may use various algorithms to perform aspects of the operations described herein. In an example, the visualization application 110 may include instructions executable by the processor 116 of the server 108 as discussed above. The visualization application 110 may include instructions stored to the memory 118 and executable by the processor 116 as described herein. Computer-executable instructions may be compiled or interpreted from computer programs created using a variety of programming languages and/or technologies, including, without limitation, and either alone or in combination, JAVA, C, C++, C #, VISUAL BASIC, JAVASCRIPT, PYTHON, PERL, PL/SQL, etc. In general, the processor 116 receives the instructions, e.g., from the storage or memory 118, a computer-readable medium, etc., and executes these instructions, thereby performing one or more processes, including one or more of the processes described herein. Such instructions and other data may be stored and transmitted using a variety of computer-readable media.

The web client 138 may be a web browser, or other web-based client, executed by the client device 112. When executed, the web client 138 may allow the client device 112 to access the visualization application 110 to display user interfaces of the visualization application 110. The web client 138 may further provide input received via the HMI controls 134 to the visualization application 110 of the server 108 over the network 114.

In artificial intelligence (AI) or machine learning systems, model-based reasoning refers to an inference method that operates based on a machine learning model 140 of a worldview to be analyzed. Generally, the machine learning model 140 is trained to learn a function that provides a precise correlation between input values and output values. At runtime, a machine learning engine uses the knowledge encoded in the machine learning model 140 against observed data to derive conclusions such as a diagnosis or a prediction. One example machine learning system may include the TensorFlow AI engine made available by Alphabet Inc. of Mountain View, CA, although other machine learning systems may additionally or alternately be used. As discussed in detail herein, the visualization application 110 is in communication with the machine learning model 140 and may be configured to recognize features of the image data 102 for use in the efficient and scalable ground truths generation system and methods to produce high precision (pixel level accuracy) annotations that are used to develop object detection/localization and object tracking. In some embodiments, the visualization application 110 is in communication with the machine learning model 140 and may be configured to recognize audio features or patterns of the audio data 104 for use in a similar system to produce a viewable output on the display 132 or web client 138 of the location of the source of such audio. In some embodiments, the visualization application 110 is in communication with the machine learning model 140 and may be configured to recognize radar features or patterns of the radar data 106 for use in a similar system to produce a viewable output on the display 132 or web client 138 of the location of the person of object that is detected by radar. In short, the visualization application may include, or be in communication with, a machine learning model 140 for performing various steps of image recognition (e.g., steps 606-612 of FIG. 6), audio recognition (e.g., steps 406-412 of FIG. 4), and/or radar recognition (steps 1106-1112 of FIG. 11), and/or any fusion steps that include two or more of these techniques.

The image data input source 122 may be a camera, e.g., mounted within a location such as a vehicle, fleet vehicle, public transportation, restaurant, airplane, movie theater, or other location in which large amounts of human traffic or gathering occurs, or other locations in which determining the presence and location of persons having symptoms of illnesses may be deserving. The image data input source 122 is configured to capture image data 102. In another example, the image data input source 122 may be an interface, such as the network device 120 or an interface to the storage 118, for the retrieval of previously-captured image data 102. The image data 102 may be a single image, or a video, e.g., a sequence of images. Each image in the image data 102 may be referred to herein as a frame. For privacy concerns, faces and license plates may be blurred from the image data 102 for certain annotation or visualization tasks.

The audio source 124 may be an acoustic sensor or microphone mounted in the exemplary locations described above, and are configured to detect and localize events of interest (e.g., regions in which symptoms of illnesses occur). The audio source 124 is configured to capture audio data 104. In another example, the audio input source 124 may be an interface, such as the network 120 or an interface to the storage 118, for the retrieval of previously-recorded audio data 104. The audio data 104 may be received audio from the audio source 124 (e.g., microphone) that can be detected and/or recorded at all times as the audio source 124 is active. As will also be described herein, the audio source 124 may be multiple audio sources 124 in an array or in various locations, allowing triangulation or location to be determined of the subject occupant with symptoms of illness.

The radar source 126 may be a contactless sensor configured to detect human vital signs, such as respiration, breathing rate, heart rate, heart rate variability, and human emotions, by analyzing the interaction between radiofrequency signals and physiological movements, without requiring any contact with the human body. A non-limiting example of such a radar source 126 is Doppler SDRadar in which a continuous wave (CW) narrow-band signal is transmitted, reflected off the human target, and subsequently demodulated in the receiver of the radar source 126. Other radar sources 126 include ultra-wideband (UWB) radar or other CW radar devices, or millimeter wave sensors such as 60-GHz or 77-GHz mmWave sensors.

Figure 2:
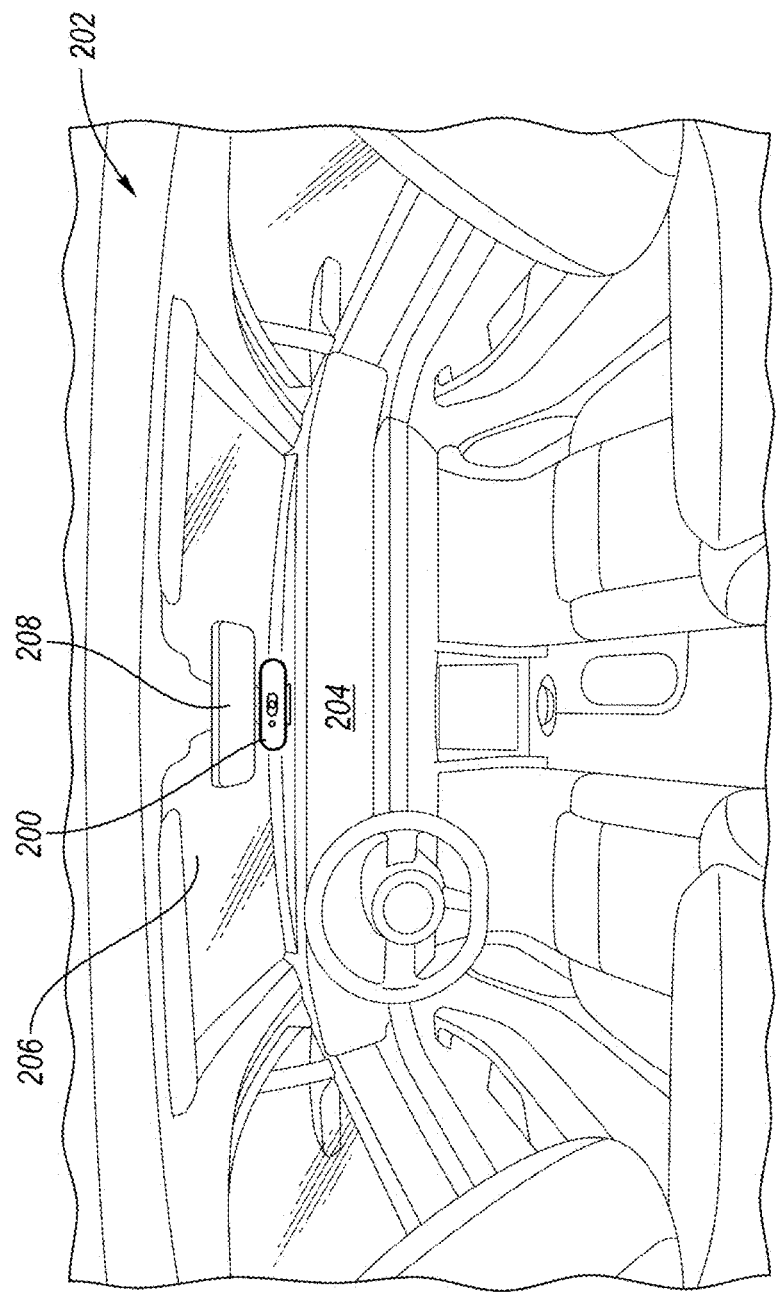
FIG. 2 illustrates an interior of a vehicle showing a location of a sensor, according to an embodiment.

FIG. 2 show an embodiment of a placement of a sensor 200 within a vehicle 202. The vehicle 202 may be a passenger vehicle such as a car, van, truck, sports-utility vehicle (SUV), and the like. As described herein, in other embodiments the vehicle is a bus, train, plane, or other public-transportation vehicle. The sensor can be one or more of the image source 122, audio source 124, radar source 126, or any combination thereof. Deployment and placement of the sensor may depend on the environment. For example, in the illustrated embodiment, the sensor 200 is mounted on or to a dashboard 204 of the vehicle 202. In other embodiments, the sensor 200 is mounted on or to a windshield 206, a rear-view mirror 208, or other locations in the vehicle 202. In embodiments, the sensor 200 is mounted at a location such that it can properly receive the image data, audio data, and/or radar data from occupants within the vehicle 202.

Figure 3:
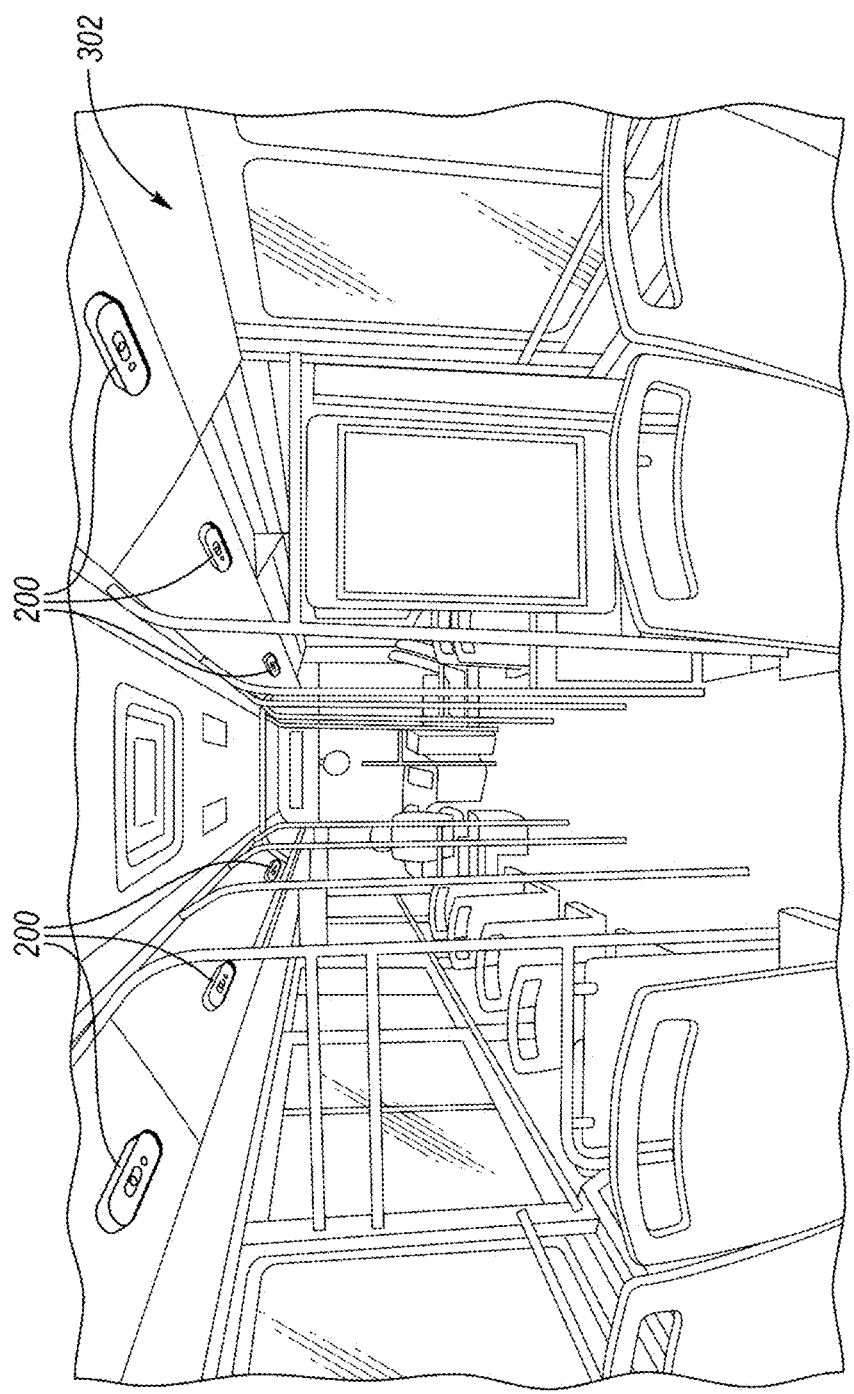
FIG. 3 illustrates an interior of a bus showing one or more locations of a sensor, according to an embodiment.

Instead of using a single sensor 200, an array or plurality of sensors 200 may be placed throughout the vehicle. In embodiments in which the vehicle is a bus or other large, multi-passenger vehicles, multiple sensors 200 may be utilized throughout the vehicle. More sensors may be useful to cover a large shared mobility space, such as in a bus or a train. As an example, deployment of multiple sensors 200 in a bus 302 is shown in FIG. 3. The sensors may be deployed in other areas of the bus 302 including the ceiling, beneath or above seats, and other locations.

As described herein, the sensors 200 may be utilized in any vehicle, particularly one that is utilized to transport multiple occupants either at the same time (e.g., a bus) or at individually separate times (e.g., ride-hailing or fleet vehicles, vehicle renting, etc.). Also, the sensors 200 may be located in non-vehicular locations such as restaurants, public buildings, airports, arenas, stadiums, venues, and other such locations in which a high amount of human traffic or density may occur. In short, the description and illustrations provided herein is not intended to be limited to usage of the sensors 200 within only vehicles.

Figure 4:
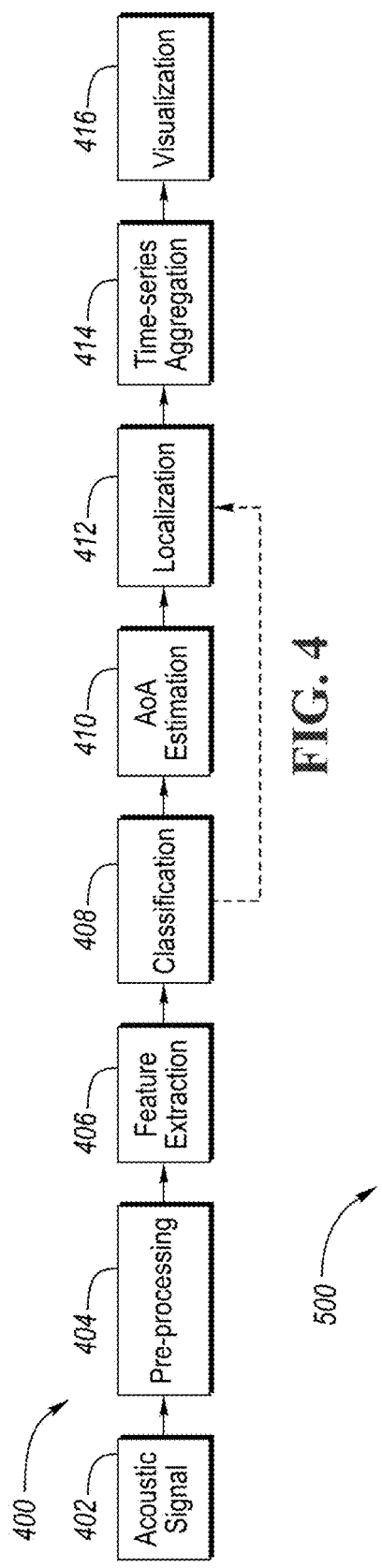
FIG. 4 illustrates a flow chart for detecting and displaying symptoms of occupant illness based on audio data, according to an embodiment.

FIG. 4 illustrates a flowchart of an embodiment of a system 400 for detecting events that indicate symptoms of occupant illness, localizing the events, and displaying related information in a visualization. These steps can be performed by at least some of the structure shown in FIG. 1, such as the processors 116, 128, audio sources 124, storage 118, audio data 104, etc. In this embodiment, one or more of the sensors 200 are placed about a desired location having occupants, such as the aforementioned vehicles, buildings, and the like. In this embodiment, one or more of the sensors includes an audio source 124, such as a microphone. The audio source 124 is configured to, when in use, continuously listen to audio sound at a specific sampling rate. In other words, at 402, the system receives audio data 104 such as an acoustic signal from the audio source 124.

The system 400 can include a pre-processing step at 404. The captured audio data 104 is denoised using a filter. Then the audio data 104 is segmented using a sliding window algorithm. Also, privacy-preserving audio processing can be used to comply with user privacy requirements. For example, the system can be configured to selectively cancel or reject human speech from the continuous audio stream by voice activity detection (VAD) algorithms. By performing VAD at a pre-processing stage, it can avoid unnecessary coding or transmission of silence packets or can remove noise or irrelevant speech, saving on computation and on network bandwidth. Various embodiments of VAD is contemplated and should be included in the scope of this disclosure. For example, many VAD systems follow the general architecture of (i) first performing a noise reduction, then (ii) calculating features or quantities from a section of the input signal such as the audio data 104, and then (iii) applying a classification rule to classify the section as speech or non-speech, optionally applying a threshold and comparing the classified noise to the threshold.

The system 400 can also include a feature extraction model or application at 406. At this step, relevant audio data that has been denoised and filtered as described above is then extracted for analysis. Mel Frequency Cepstral Coefficients (MFCC), SoundNet convolutional neural network (CNN) or other types of machine learning, time domain features, frequency domain features, and/or a combination of these can be used at this step to extract the relevant features of the audio data. The extracted data (audio feature representations) can be stored as multidimensional vectors or matrices depending on the type of feature extraction algorithm.

The system 400 can also include a classification model or application at 408. At this step, a classifier is used to classify the audio events. Portions of the pre-processed and extracted audio data can be classified as a sneeze, cough, shortness of breath, or other such sounds that can indicate a potential of illness of an occupant. For this purpose, a support vector machine (SVM), random forest, or multilayer perceptron classifier can be used. The machine learning model 140 described herein may be implemented for this purpose. Also, audio feature learning and classification can be performed in an end-to-end fashion using deep audio analytics algorithm, in which time-domain waveforms are used as inputs. A CNN with, for example, 34 weight layers, can be efficient to optimize over very long sequences, such as a vector size of 32,000 to process acoustic waveforms. This can be achieved through batch normalization and residual learning. An example of such model is disclosed in Wei Dai, Chia Dai, Shuhui Qu, Juncheng Li, Samarjit Das, "Very deep convolutional neural networks for raw waveforms", IEEE International Conference on Acoustics, Speech and Signal Processing (ICASSP), 2017.

The system 400 can also include an angle of arrival (AoA) estimation or determination at 410. AoA can be implemented to estimate the location of the source of the sound such that the system can estimate where the cough, sneeze, or the like was originating from. To perform this, the system may include multiple sensors 200 or audio sources 124. Beamforming algorithms can be used to estimate the AoA of the incoming acoustic signal. If the audio source is a microphone, for example, this can be accomplished using a single microphone array with multiple microphones using a delay-sum beamforming and multiple signal classification (MUSIC) algorithm.

After an AoA estimation is completed, a localization process can occur at 412. Audio direction finding techniques such as triangulation may be implemented. This provides the source location of the events of interest (e.g., cough, sneeze, etc.). In a simplistic example, the location of the source of the analyzed sound may be determined by the processor by measuring the time difference between each of the audio sources receiving the sound. For example, if an array of microphones are used, the time between a first of the microphones receiving the audio signal and a second of the microphones receiving the audio signal is noted by the processor(s) and compared with a time between the second microphone receiving the audio signal and a third of the microphones receiving the audio signal. This process can continue for as many sensors are provided in the location of the system.

In another embodiment, as illustrated in FIG. 4, rather than pulling data from the AoA estimation step 410, the AoA estimation can be skipped and localization at 412 can be performed based on the intensity of the acoustic signal itself subsequent to the classification at 408.

At 414, the system then performs a time-series aggregation. At this step, audio events of interest detected throughout the day are aggregated. The system can calculate how many times each audio event took place in each area of the location. For example, in the case of the system being implemented on a bus, the aggregation can compile the number of times a sneezing or coughing event takes place at a particular seat on the bus. In the case of a restaurant, the aggregation can compile the number of times a sneezing or coughing event takes place at a particular table in the restaurant. This aggregation 414 can aggregate the number of audio events indicating illness at each audio source (e.g., microphone), or at each determined (e.g., triangulated) location. The results of the aggregation can be stored locally on the storage 118 or in the cloud via the network 114.

The results of the aggregation 414 can trigger a flag in the system indicating that a particular region of interest was subject to a number of occupant illness symptoms, and needs disinfecting. For example, the aggregation may indicate that a particular seat within the bus was subject to a number of occupant illness symptoms via the audio signal processing, and may flag this region of the bus as infected until the seat is cleaned. The number of detected occupant illness symptoms may be compared to a threshold to flag the region as infected. For example, the threshold may be three, such that when the system detects three detected occupant illness symptoms (e.g., coughing or sneezing as detected by the audio signals) since the most recent cleaning, the system will flag this area as infected until the area is once again cleaned. The aggregation can be reset to zero after the target area is disinfected.

The system can then perform a visualization at 416. At this step, the aggregated information from 414 is shown to a person in a way that allows the person to see the data in a visual-friendly format. The visualization can be viewable at the client device 112 (e.g., display device or user interface) as transferred through the network 114, or can be viewed locally. In one example, a "heat map" can be shown to the person for visualization. The heat map may be color-coded, with different colors shown at locations corresponding to the number of detected illness symptoms detected at those locations. The visualization may include a background image. The background image may be either a still, single image of the location of the occupants (e.g., an empty bus). Alternatively, the background image may be a live view (e.g., video) of the location of the occupants. The heat map with the colors corresponding to the location of detected illness may be overlaid onto the background image.

Figure 5:
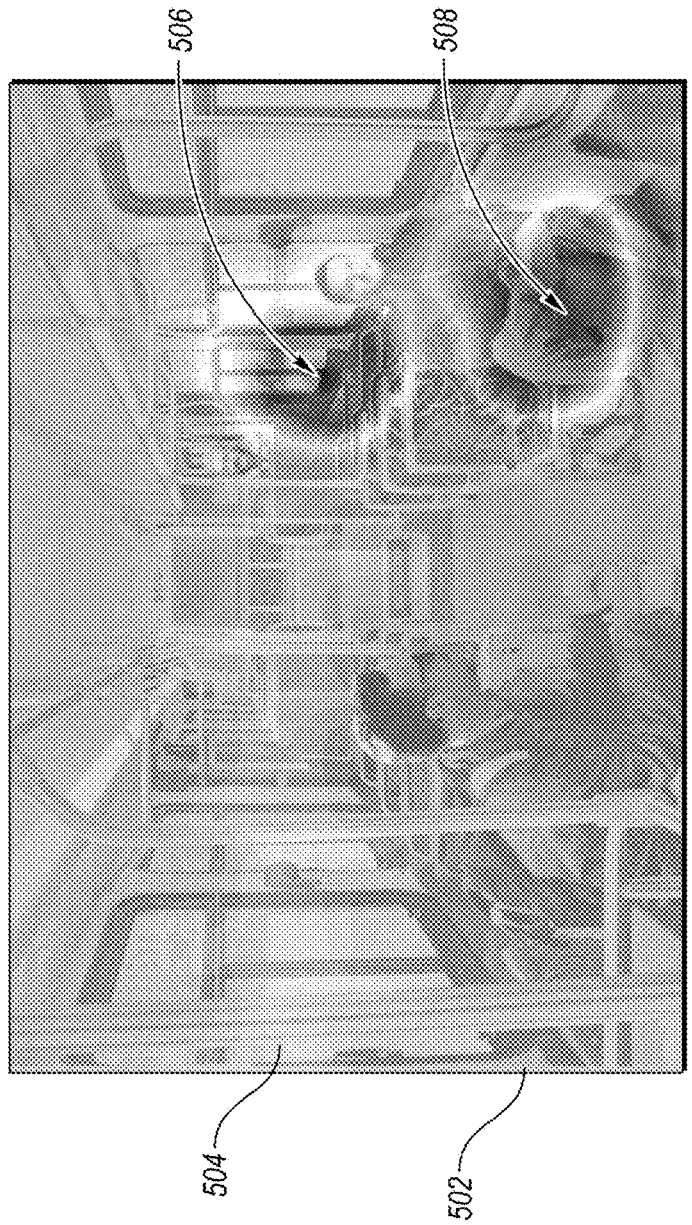
FIG. 5 illustrates an output of a visualization application to highlight areas of higher amounts of detected symptoms of occupant illness, according to an embodiment.

FIG. 5 shows an example of a visualization 500 shown on a display for person to view. The image shown in FIG. 5 is taken from an image or video source, such as a camera or image source 122. In this example, the image source 122 is mounted within a bus to show a live image of an interior of the bus 502. The system can be pre-programmed such that the locations shown in the image are matched with a corresponding location as detected from the audio sources 124. In other words, the location of illness symptoms as detected by the audio sources 124 as explained herein can be overlaid on an image taken from the image source 122; the match between the locations shown in the images and the locations determined by the audio sources can be made at a preliminary step such that the processors can simply color-code the image in an area that matches with the determined locations of the detected illness symptoms from the audio sources 124.

In the embodiment shown in FIG. 5, the vast majority of the background image 502 shown is overlaid with an overlaid image 504. In this embodiment the overlaid image 504 includes a blue or darkened hue where no detected illness symptoms are detected. In other embodiments, the overlaid image 504 is clear, such that the background image 502 is not distorted or color coded in regions where no detected illness symptoms are detected. Using the system explained herein, the signals received from the audio sources 124 are processed, and locations of detected illness symptoms from occupants are determined. These locations correspond with different color hues or shades, as shown by regions 506 and 508. Region 506 may correspond to a location with five detected recent occupant illness symptoms, while region 508 may correspond to a location with four detected recent occupant illness symptoms. This regions 506, 508 are also part of the overlaid image 504 overlaid onto the background image 502. Thus, the heat map shows region 506 with a slightly more red, or brighter color overlaid onto the image 502. The heat map shown in FIG. 5 is but one example of showing indicators that a detected symptom of occupant illness occurred at locations 506 and 508. In other embodiments, rather than a color-coded heat map, the overlaid image 504 can show boxes, stars, circles, or other such indicators that correspond to regions in which illness symptoms are detected.

This exemplary visualization 500 may be shown in a variety of settings. Of course, the visualization may be provided to an owner or manager of the location, such as the owner or manager of a fleet of vehicles, busses, restaurants, etc. Additionally, the visualization may be shown on a smartphone or mobile device (e.g., client device 112) of a rider or occupant of the location to provide that rider or occupant with an informed decision as to locations that should be avoided to reduce the chances of transmission of infection. The network 114 may communicate such information to the mobile device through the exemplary structure explained herein. The visualization may also be integrated into an augmented reality (AR) app of the rider or occupant's mobile device. The visualization may also be provided on a display mounted within the area (e.g., within the bus) to inform current occupants of the locations of potential contamination.

In another embodiment, instead of displaying the aggregated information, the aggregated information can be stored locally, and a user can be notified when he/she is near a location in which a high (e.g., above a threshold) amount of detected occupant illnesses have been detected. Each sensor 200 may be equipped with a speaker, and may output an audio notification when the user is near such a potentially contaminated area that has not yet been cleaned.

Figure 6:
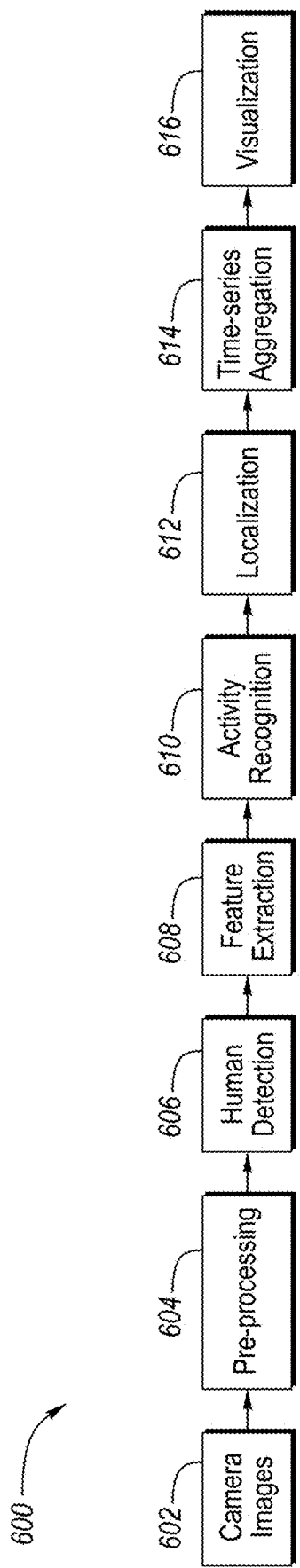
FIG. 6 illustrates a flow chart for detecting and displaying symptoms of occupant illness based on image data, according to an embodiment.

FIG. 6 illustrates a flowchart of an embodiment of a system 600 for detecting events that indicate symptoms of occupant illness, localizing the events, and displaying related information in a visualization. Once again, these steps can be performed by at least some of the structure shown in FIG. 1, such as the processors 116, 128, image sources 122, storage 118, image data 102, etc. In this embodiment, one or more of the sensors 200 are placed about a desired location having occupants, such as the aforementioned vehicles, buildings, and the like. In this embodiment, one or more of the sensors includes an image source 122, such as a camera. The image source 122 is configured to, when in use, continuously capture images or a series of images (video) at a specific sampling rate. In other words, at 602, the system receives image data 102 such as a captured image from the image source 122.

The system 600 can include a pre-processing step at 604. The captured images can be resized at 604 to a base size for all images fed into the system for consistency. The captured images can also be denoised to smooth the image and remove unwanted noise. One example of denoising is using a Gaussian blur. Still during the pre-processing step at 604, the image can be segmented, separating the background from foreground objects. Other pre-processing functions can be performed to prepare the image for processing with human detection, feature extraction, and the like.

Once the image is pre-processed 604, the system performs a human detection step at 606. One or more object-detection techniques can be used, such as You Only Look Once (YOLO), single-shot multibox detector (SSD), Faster R-CNN, and the like. Many of these object-detection techniques leverage pre-trained models for "human" or "person" detection. This may be performed as part of the machine learning model 140, for example.

Figure 7:
FIG. 7 illustrates implementation of a human-detection application to detect humans based on the data from the sensor, according to an embodiment.

FIG. 7 shows an image 700 of occupants within the subject area, such as a bus. The human-detection techniques of step 606 provide bounding boxes around each detected human, as shown in yellow bounding boxes 702, 704, 706 in FIG. 7. Some of the object-detectors, such as YOLO, also provide an output that includes the percentage of confidence that a detected object is in fact a human. By default, the bounding boxes will be placed around a human if only a certain confidence (e.g., 50% or higher) is met. However, this confidence threshold can be adjusted.

Referring back to FIG. 6, with humans being detected at 606, the system can execute feature extraction application or model at 608. At this step, relevant visual features are extracted from each person for their action recognition—to recognize a sneeze, cough, or other such movement that would indicate a potential illness. To capture the spatiotemporal features, two-dimensional (2D) convolutional network (ConvNet) can be inflated to three-dimensional (3D) convolutional network and Inflated 3D ConvNet (I3D) features can be used. Filters and pooling kernels of very deep image classification ConvNets can be expanded into 3D, making it possible to learn seamless spatio-temporal feature extractors from images or video. Alternately, deep convolutional networks like VGG16 (Simonyan, Karen, and Andrew Zisserman. "Very deep convolutional networks for large-scale image recognition." arXiv preprint arXiv:1409.1556 (2014)) or ResNet (He, Kaiming, et al. "Deep residual learning for image recognition." Proceedings of the IEEE conference on computer vision and pattern recognition (2016)) can be used to extract spatial features and later integrated into an LSTM-based network for action recognition. A sliding window may be used to capture features of each person within that time window. Also, a neural network like OpenFace (Amos, Brandon, Bartosz Ludwiczuk, and Mahadev Satyanarayanan. "Openface: A general-purpose face recognition library with mobile applications." CMU School of Computer Science 6 (2016)) or DeepFace (Taigman, Yaniv, et al. "Deepface: Closing the gap to human-level performance in face verification." Proceedings of the IEEE conference on computer vision and pattern recognition, 2014) can be used to capture facial features. Using these feature extraction systems, facial features can be used for activity recognition and detecting additional health parameters. For example, the facial feature extraction systems can extract human facial features or body features that are later used for detecting potential illness, such as sneezing, coughing, a runny nose, redness of eyes, fatigue, rashes, or physical pain. Therefore, a person's nose, eyes, mouth, and hands may be detected and extracted via the feature extraction model at 608.)

Privacy preserving techniques can be employed to preserve the privacy of the occupants. In one embodiment, pixels of the captured images are transformed in a way that facial recognition algorithms cannot identify people, but the features for activity recognition are minimally affected by such a transformation.

With the facial and body features extracted, an activity recognition step can be performed at 610. At this step, using the extracted visual features, a classifier is used to classify the activity of the person. For this purpose, a fully connected layer can be added next to the feature map extracted in the extracted step 608. Alternatively, a support vector machine (SVM), random forest, or multilayer perceptron classifier can be used. The classifiers may classify the visual event to the following events of interest: sneezing, coughing, shortness of breath, runny nose, tears, redness of eyes, fatigue, physical pain, and/or vomiting. This may be referred to as performing an illness-detection operation, or more broadly, an activity recognition model. The model can use machine learning systems such as those described herein.

Figure 8:
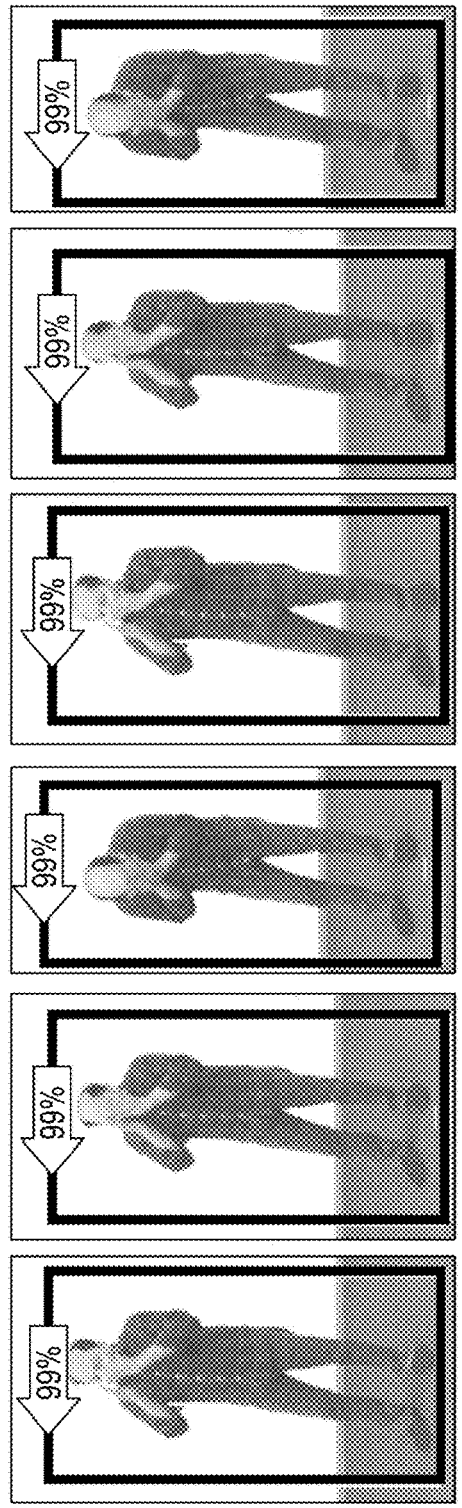
FIG. 8 is a sequence of frames illustrating the use of an illness-detection operation or classification.

As an example, FIG. 8 shows a sequence of frames demonstrating a person is sneezing. When a person sneezes or coughs, that activity can be sub-classified by detecting whether the person's hands were covering the person's face during the incident, combined with movement of the head. This is one example of the output of an illness-detection operation using the image data.

The classifiers may also classify the visual event as someone disinfecting the area, by the events indicating a person is wiping or spraying the area. This can be logged as a positive cleaning event, which can reset the time-series aggregation, or can be used to update the cleanliness of the area as stored in the system.

Referring back to FIG. 6, the system may employ localization at 612. At this step, using the coordinates of the bounding box of the person of interest, the location of the event is estimated. This can be done by depth analysis of the person relative to his or her surroundings within the field of view. This can be performed by a single image capturing device, or multiple image capturing devices for additional confidence. A prior step may be provided to calibrate the image capturing device in order to map how each pixel relates to its physical real-world location. One or more of the image sources 122 may be equipped with on-board depth detection, such that the depth (e.g., distance from the image source) of any given object within the image can be determined. Alternatively, such information can be determined from an off-board system, analyzing the image, with known variables such as location of the image source, distance between certain features in the image, etc.

At 614, the system then performs a time-series aggregation similar to step 414 in FIG. 4. At this step, the events of interest are detected throughout the day, and are aggregated to judge the cleanliness of a particular area. For example, the processors can calculate and store how many times each captured potential-illness event (e.g., coughing, sneezing, etc.) took place in each area of the field of view. This may be computed locally at each sensor, or in the cloud. The values can be reset automatically after it is detected that someone has cleaned that area. Alternatively, or in addition, the values can be reset after a certain amount of time has passed with no human activity (e.g., 12 hours, or overnight) or it can be reset manually.

After a time-series aggregation has been performed, the information can be presented to a user via a visualization at 616. This visualization can be similar to the visualization of 416 described above. In particular, the image of the field of view of the image-capturing device can be overlaid with a "heat map" that changes in intensity or color based on the number of potential-illness events detected in those areas.

In another embodiment, thermal cameras can be used as additional image-capturing devices in addition to RGB cameras. The thermal cameras can be used to estimate body temperature of a detected human to detect a potential fever, and augment the aforementioned analysis accordingly.

Figure 9:
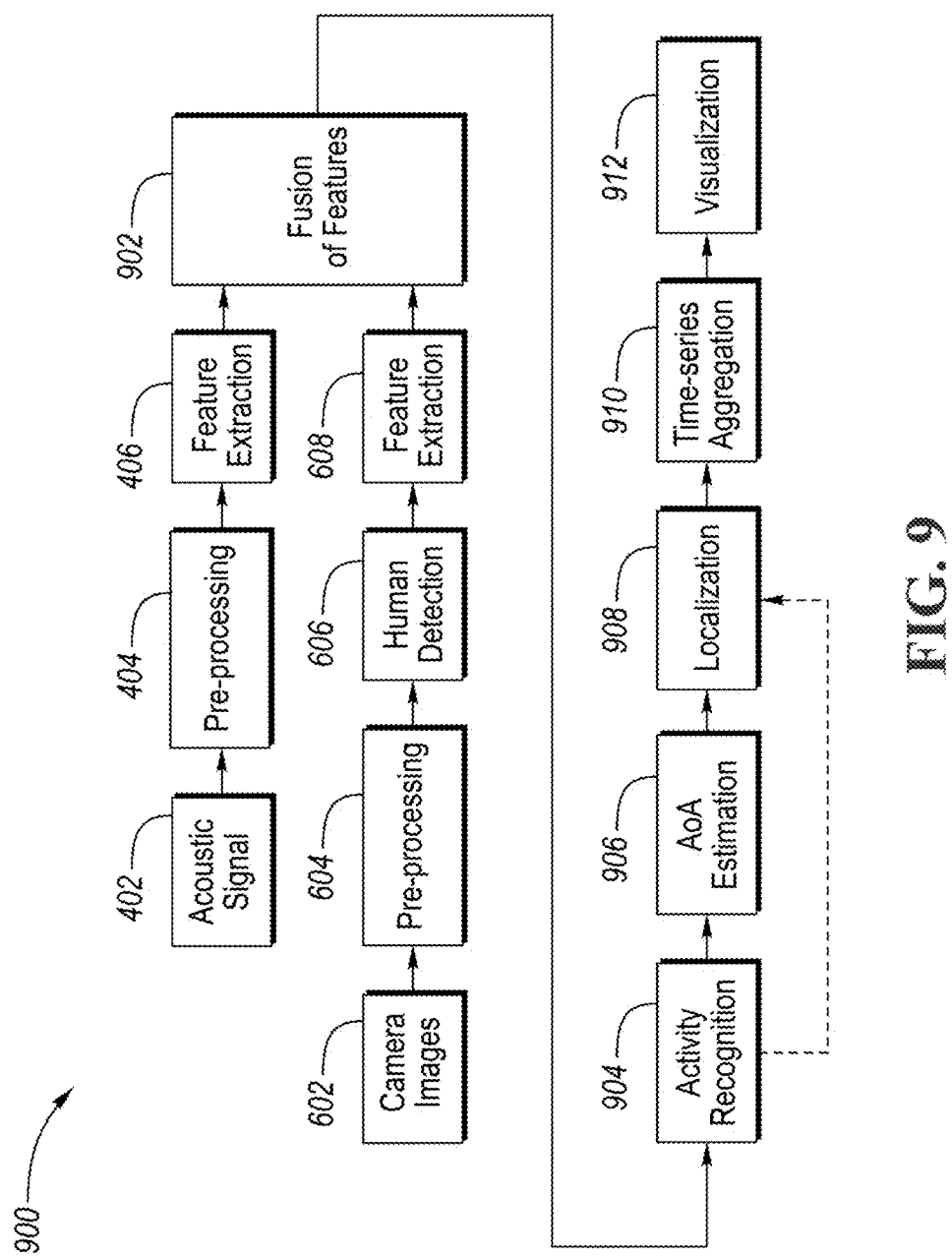
FIG. 9 illustrates a flow chart for detecting and displaying symptoms of occupant illness based on a fusion of image data and audio data, according to an embodiment.
Figure 10:
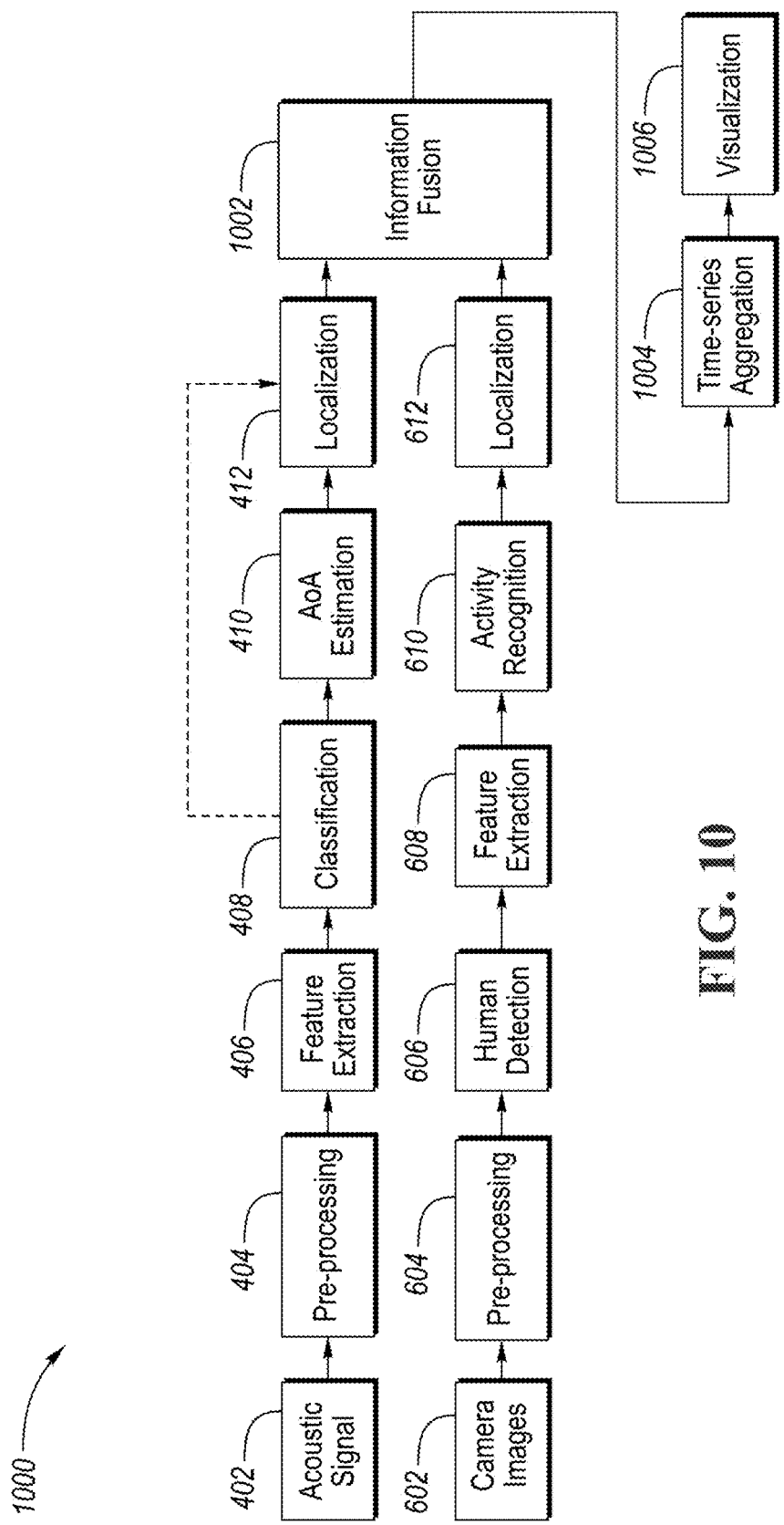
FIG. 10 illustrates a flow chart for detecting and displaying symptoms of occupant illness based on a fusion of image data and audio data, according to another embodiment.

FIGS. 9 and 10 illustrates a flowchart of an embodiment of systems for detecting events that indicate symptoms of occupant illness, localizing the events, and displaying related information in a visualization, while using a fusion of audio and visual data. In the embodiments of FIGS. 9 and 10, image data 102 and audio data 104 are fused together to improve the recognition capabilities of the system. The sensors described above may include both an audio source and an image source. Alternatively, the subject area may be equipped with an array of audio sources and image sources separately throughout the area.

Referring to FIG. 9, an embodiment of a system 900 for detecting and displaying symptoms of occupant illness is shown with fusion of audio and image data. Regarding the audio data 104, acoustic signals are acquired at 402, and are pre-processed at 404, and feature extraction is performed at 406. These steps are similar to those described with reference to FIG. 4. Regarding the image data 102, images are captured at 602 from an image source (e.g., camera). The images are pre-processed at 604, and human detection is employed at 606 along with feature extraction at 608. These steps are similar to those described with reference to FIG. 6.

A fusion layer is added at 902 to fuse the audio data from steps 402, 404 and 406 with the image data from steps 602, 604, 606 and 608. The fusion can be implemented to confirm or improve the confidence level of the data acquired. For example, a subset of the occupant illness symptom data detected from a single individual may indicate an illness with that individual, but not all individuals will indicate all possible symptoms of an illness. Further, certain symptom indications may not be as severe as others. The accuracy of the illness symptom determination may be indicated using a probabilistic scale. Information necessary to determine the probabilistic scale may be obtained from any of a variety of resources.

In fusing the audio and image data, the accuracy may be improved. For example, if the determined angle of arrival of a cough from the audio source is consistent with the location from the image source of a jerking head associated with the cough, then the coughing data may be determined to be accurate and reliable. With the fusion of features, events of interest are detected using a fused feature map. Downstream of the fusion, a step of activity recognition at 904 can be performed, which is similar to step 610 described above except now with the confidence of audio added to the video. For example, if the image signal processing described herein and shown in FIG. 8 yields a certain illness symptom, the fused audio data can confirm the presence of illness symptoms by corresponding the activity recognized by image processing with audio realized by the audio source(s) of the sound of a sneeze, for example.

Then the system performs AoA estimation 906, localization 908, time-series aggregation 910, and visualization 912 as described above.

FIG. 10 illustrates an embodiment of a system 1000 for capturing audio and image data, processing said data, fusing the data, and building a visualization from the fused data. Here, detection from each modality (e.g., microphone and camera) is compared and checked for agreement. For example, an acoustic signal is captured at 402, pre-processing occurs at 404, feature extraction occurs at 406, classification occurs at 408, an optional step of AoA estimation occurs at 410, and localization occurs at 412. Simultaneously, camera images are obtained at 602, pre-processing of those images is performed at 604, human detection is implemented at 606, feature extraction is implemented at 608, activity recognition is performed at 610, and localization is performed at 612. In a step of fusing at 1002, the confidence score from each modality is considered to filter out incorrect detection. For example, to flag an event as one in which an illness symptom has occurred, both the audio and camera data must have a confidence above a certain threshold. In another embodiment, a sliding scale may be implemented in which a lower threshold of one modality (e.g., camera) is acceptable based on an increasing confidence of the other modality (e.g., microphone). As one source of data is more confident, the threshold for a positive detection of symptoms of illness for the other source of data may be lowered.

Following the fusion of information or data, a timer-series aggregation of the fused data is performed at 1004. A visualization is output at 1006 based on the time-series aggregation of fused data. The visualization can be a heat map, like the ones described herein.

The system disclosed herein can also operate with radar, as opposed to (or in combination with) audio and image data. FIG. 11 illustrates a flowchart of an embodiment of a system 1100 for detecting events that indicate symptoms of occupant illness via radar, localizing the events, and displaying related information in a visualization. Radar devices such as radar sources 126 described herein enable the ability sense vital sign parameters such as breathing rate, heat rate, heart rate variability, and human emotions that may not otherwise be possible to obtain using the audio and image techniques described herein.

Additionally, radar sources 126 can also detect coughing, sneezing, sudden falls, or other such movement that would indicate a symptom of a potential illness. Coughing and sneezing introduces a unique pattern of chest movement, upper body movement, or whole-body movement that can be detected by the radar source 126 and processed as described herein. Vitals signs can also be used to differentiate between benign cases such as seasonal allergies, asthma, and the like from actual sickness. In other words, a detected sneeze in isolation may not warrant a flag of a potential illness if the radar sources 126 do not also detect a deviated heart rate, breathing rate, chest movements, or the like that deviate from established norms.

The system first detects the location of the target person. The location information can be obtained through the distance and angle estimations using the radar sources. Radar signals reflected form the target person can capture such body movements in a contactless way. With the help of signal processing techniques and/or machine learning models, coughing, sneezing, or other illness symptom events can be detected. The system also maps between the illness symptoms with a target person.

The system 1100 first obtains a radar baseband signal. One or more radar sources 126 are deployed and installed in the desired location for occupant detection, such as a vehicle of a fleet. The radar source 126 can include infrared (IR) radar and Frequency-Modulated Continuous Wave (FMCW) radar. The locations of the radar sources 126 are also recorded during the deployment. Acquisitions of raw radar signals are performed by connecting the radar sensor to a data recording device to obtain and record radar data 106. The raw radar signals may include I and Q sample, amplitude, and/or phase information.

With a baseband radar signal obtained, and radar data 106 obtained and recorded, a pre-processing of the data can occur at 1104. In this step, the system performs one or more methods including de-noising, alignment, filtering, handling missing data, and upsampling. This can better condition the data for the main processing steps of human detection, feature extraction, vital sign recognition.

At 1106, the system employs human detection based on the pre-processed radar data. Given the known radar sensor locations, the location of one or more occupant targets in 2D or 3D space is extracted. The radar data is obtained by receiving reflected radio waves back at the sensor. So, the step of human detection can be done by, for example, estimating the distance and/or the angle from the target occupant based on the reflected radio waves. Human detection may be done by various methods, one of which disclosed in Ram M. Narayanan, Sonny Smith, Kyle A. Gallagher, "A Multifrequency Radar System for Detecting Humans and Characterizing Human Activities for Short-Range Through-Wall and Long-Range Foliage Penetration Applications", International Journal of Microwave Science and Technology, vol. 2014, Article ID 958905, 2014.

At 1108, features can be extracted from the detected human based on the radar data. The features include time domain features, frequency domain features, and space domain features. A feature extraction procedure for radar human recognition based on Mellin transform of the time sequences of radar cross section (RCS) measurements may also be utilized; the mathematical relationship between target scattering distribution in the cross range and the RCS amplitude is derived and analyzed, and the RCS features are extracted using sequential method. Using a time domain feature, the extraction can identify breathing rates, heart rates, and the like that require a look at signal patterns over time. Also, identifiable areas of the human can be extracted, such as eyes, nose, mouth, hands, chest, and the like in which illness symptoms will be analyzing. For example, hands covering the face and sudden head movements for illness detection first require an identification of the hands and face.

With features extracted, vital signs (e.g., heart rate, breathing rate, etc.) and sudden movements (e.g., coughing, sneezing, falling, etc.) can be recognized at 1110. This can be performed with a classification model (such as those described herein with respect to audio and image classification) that can predict and estimate, with a noted degree of confidence, what activity, vital sign, or sudden movement is being performed by the target occupant. This can include signal processing and/or machine learning models that may include, but not limited to, Fast Fourier Transform (FFT), independent components analysis (ICA), Principal Components Analysis (PCA), Nonnegative Matrix Factorization (NMF), and wavelet transform classification models.

While the existence of radar already provides localization, a step of localization at 1112 can include localizing the target occupant based on any potential anomalies. For example, if there are unwanted noise or other errors with one of the radar sources 126, one or more other radar sources can be used to determine the location of the target occupant with illness symptoms.

At 1114 and 1116, a timer-series aggregation and visualization can be performed, respectively. These steps can be similar to those described herein, such as steps 414, 416, 614, 616, 910, 912, 1004, and 1006. For example, a heat map or the like as described above can be displayed to a user or occupant that overlays shaded colors onto an image of the location where the occupants are.

FIG. 12 illustrates a flowchart of an embodiment of another system 1200 for detecting events that indicate symptoms of occupant illness via radar, localizing the events, and displaying related information in a visualization. The system 1200 is a simplified version of the system 1100 described above, including many of the same steps. In this embodiment, feature extraction is removed, and activity recognition 1210 is utilized in isolation. At 1210, this step involves sudden movement detection such as coughing/sneezing or fall detection. The classification model will predict the current event is a coughing or sneezing or fall or other similar illness symptom event.

Figures 13, 14:
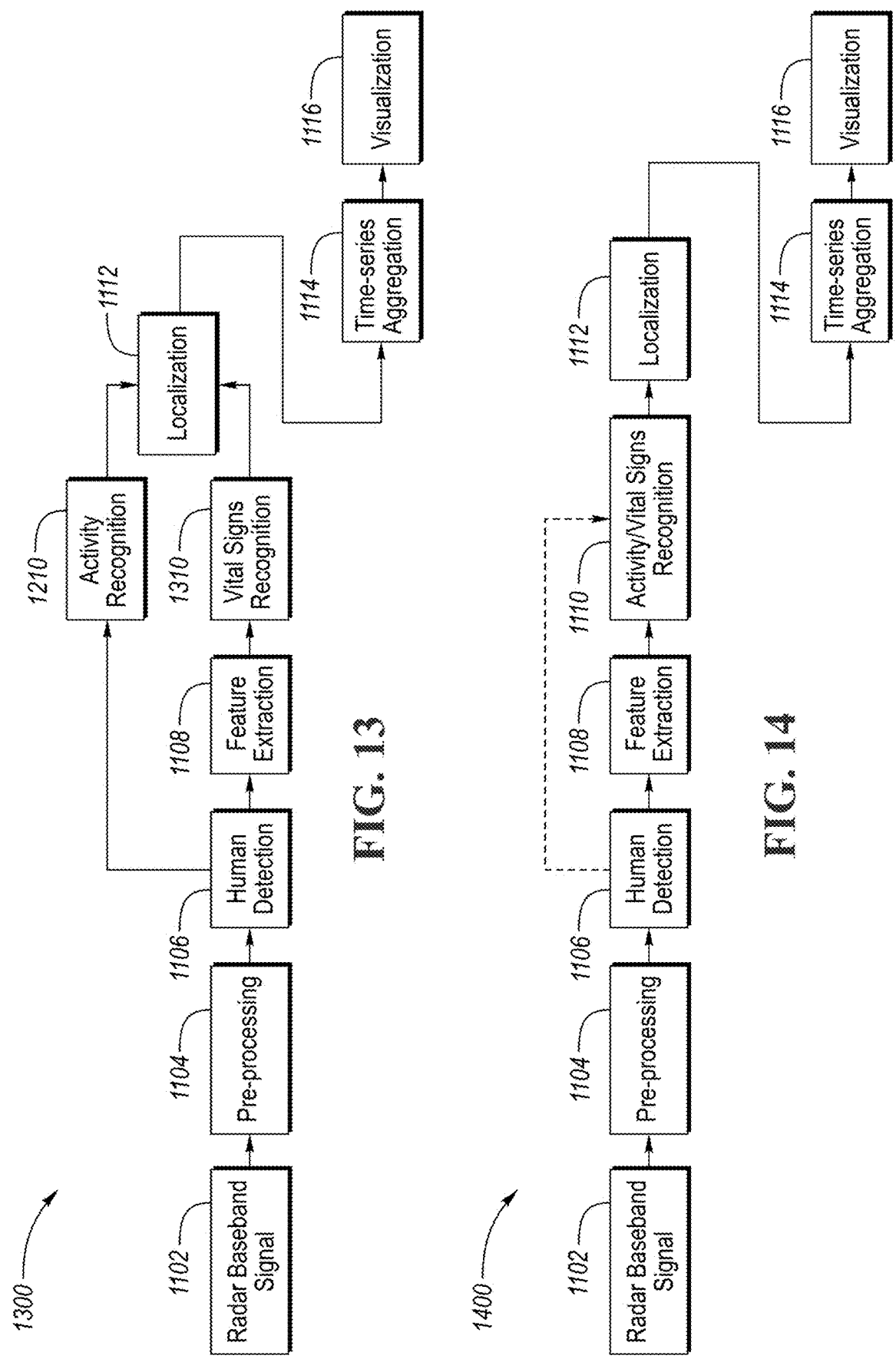
FIG. 13 illustrates a flow chart for detecting and displaying symptoms of occupant illness based on radar data, according to another embodiment.
FIG. 14 illustrates a flow chart for detecting and displaying symptoms of occupant illness based on radar data, according to another embodiment.

FIGS. 13 and 14 show additional flowcharts of embodiments of other systems 1300, 1400, respectively, for detecting events that indicate symptoms of occupant illness via radar, localizing the events, and displaying related information in a visualization. In FIG. 13, the activity recognition 1210 is separate from vital signs recognition at 1310, and then both are merged in the localization step at 1112. This can provide separate radar sensors, with one dedicated for activity recognition and another dedicated for vital signs recognition. In FIG. 14, which is a more simplified embodiment, the system 1400 has an option to remove the feature extraction step 1108 and combine the activity and vital signs recognition into the single step of 1110.

Figure 15:
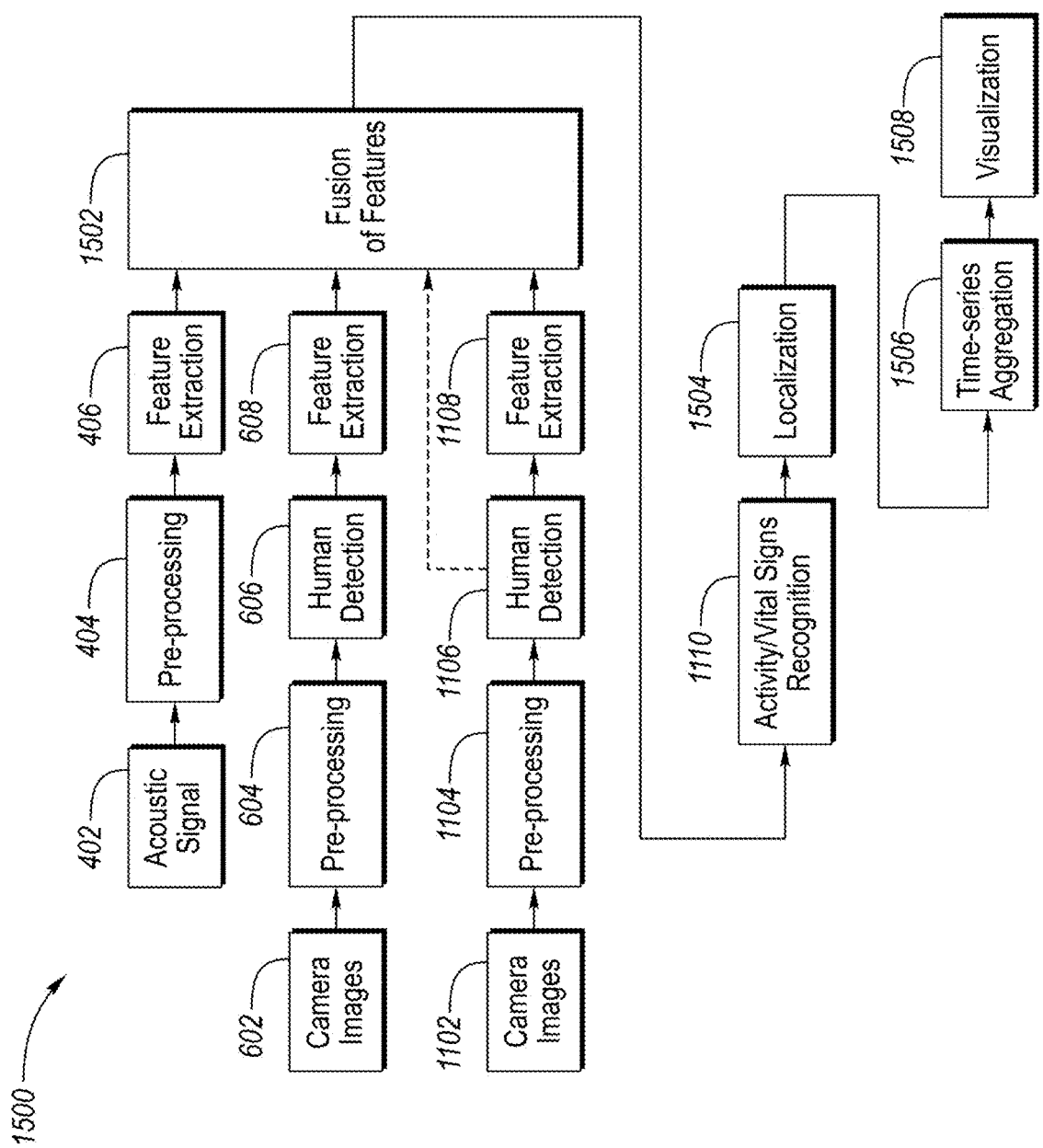
FIG. 15 illustrates a flow chart for detecting and displaying symptoms of occupant illness based on a fusion of radar data, image data and audio data, according to an embodiment.

FIG. 15 illustrates a flowchart of an embodiment of a system for detecting events that indicate symptoms of occupant illness via audio, image, and radar, fusing the information from all three types of sensors, and outputting a visualization based on the fused data. One or more image sources 122 are used to capture images at 602, and then one or more of the associated processors and structure of FIG. 1 is used for pre-processing 604, human detection 606, and feature extraction 608. One or more audio sources 124 is used to acquire an acoustic signal at 402, and then one or more of the associated processors and structure of FIG. 1 is used for pre-processing 404 and feature extraction 406. One or more radar sources 126 are used to establish a radio frequency baseband signal 1112, and then one or more of the associated processors and structure of FIG. 1 is used for pre-processing 1104, human detection 1106, and optionally feature extraction 1108.

The system 1500 includes a step of fusion 1502, in which the audio, image, and radar data is all fused together to create a comprehensive check and analysis of a potential illness of an occupant. The radar data can be checked for accuracy by processing the audio data and image data; the image data can be checked for accuracy by comparing with the radar data and audio data; the audio data can be checked for accuracy by comparing it to the radar and image data. This step may be similar to the fusion step 902 described above, except with the addition of the radar data.

The result of the fusion of features at 1502 is then passed to 1110 where an activity and/or vital signs are recognized from the radar data, as described above. Then a step of localization at 1504, along with time-series aggregation at 1506 and a visualization 1508 of the fused data is performed. By fusing radar data with audio and image data, a more comprehensive and accurate visualization can be provided to the user.

Figure 16:
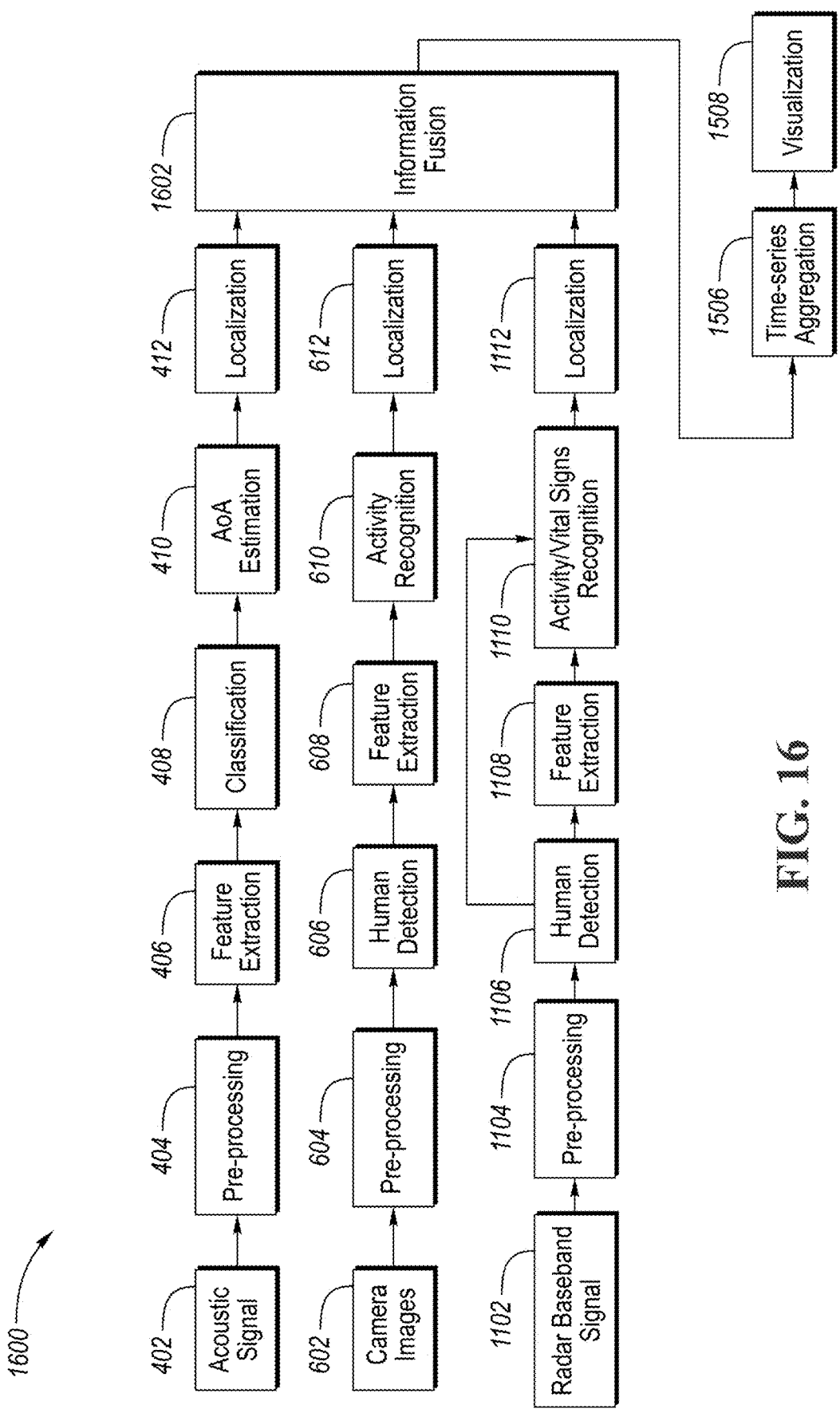
FIG. 16 illustrates a flow chart for detecting and displaying symptoms of occupant illness based on a fusion of radar data, image data and audio data, according to an embodiment.

FIG. 16 illustrates a system 1600 according to a similar embodiment, except with the fusion of information 1602 occurring after localization is performed at 412, 612 and 1112. This embodiment illustrates that several architecture and layouts of the various steps of signal processing and fusion are contemplated by this disclosure; fusion of data can occur in many variants of time along the processing pipeline.

The techniques described herein can be corroborated with additional systems in the surrounding area. For example, if the techniques described herein are utilized in a passenger vehicle, the processors can access data from other vehicle systems. In one embodiment, a seat of the vehicle may be provided with a weight sensor; if there is a sudden fluctuation of weight on the seat at the same time as a detected sneeze of cough, this may further help the accuracy (e.g., provide a sanity check) of the systems described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for detecting symptoms of occupant illness, the system comprising:
   user interface;
   a storage configured to maintain a visualization application and image data from an image source; and
   a processor in communication with the storage and the user interface, and programmed to:
     receive the image data from the image source, the image data including a background image associated with an area that occupants are occupying,
     execute a human-detection model configured to detect the occupants within the image data,
     execute an activity-recognition model configured to recognize image-based symptoms of illness in the detected occupants within the image data based on movements of the detected occupants,
     determine a location of the recognized symptoms of illness utilizing the image data from the image source, and
     execute the visualization application to display, in the user interface, an overlaid image overlaid onto the background image, the overlaid image including, for each location of recognized symptoms of illness, an indicator displaying information that the recognized symptoms of illness occurred at that location, wherein the overlaid image includes a color-coded heat map that varies in intensity corresponding to a number of recognized symptoms of illness at that location.

2. The system of claim 1, wherein the processor is further programmed to utilize a convolutional network to extract relevant features from the image data, and send the extracted relevant features to the activity-recognition model for recognizing the symptoms of illness.

3. The system of claim 1, wherein the processor is further programmed to aggregate the recognized symptoms of illness over time to determine a time-series aggregation, wherein the indicator at each location changes based on the time-series aggregation at that location.

4. The system of claim 1, wherein the processor is further programmed to:
   receive audio data from an audio source,
   execute one or more models to determine audible symptoms of illness based on the audio data,
   fuse the audible symptoms of illness with the image-based symptoms of illness, and
   execute the visualization application based on the fused audible symptoms of illness and the image-based symptoms of illness.

5. The system of claim 4, wherein the fusion of the audible symptoms of illness with the image-based symptoms of illness occurs prior to the execution of the activity-recognition model such that the activity-recognition model is configured to utilize both audible symptoms of illness and image-based symptoms of illness to recognize symptoms of illness in the detected occupants.

6. The system of claim 4, wherein the fusion of the audible symptoms of illness with the image-based symptoms of illness occurs subsequent to the execution of the activity-recognition model and prior to the execution of the visualization application.

7. The system of claim 1, wherein the processor is further programmed to:
   receive radar data from a radar source,
   execute a human-detection model configured to detect the occupants based on the radar data,
   execute an activity-recognition model or vital-signs-recognition model configured to recognize radar-based symptoms of illness in the detected occupants based on the radar data,
   fuse the recognized radar-based symptoms of illness with the image-based symptoms of illness, and
   execute the visualization application based on the fused radar-based symptoms of illness and image-based symptoms of illness.

8. The system of claim 7, wherein the processor is further programmed to:
   receive audio data from an audio source,
   execute one or more models to determine audible symptoms of illness based on the audio data,
   fuse the audible symptoms of illness with the image-based symptoms of illness and the radar-based symptoms of illness, and
   execute the visualization application based on the fused audible symptoms of illness, image-based symptoms of illness, and radar-based symptoms of illness.

9. The system of claim 1, wherein the processor is further programmed to:
   process the image data to detect a presence of a body of one of the occupants.

10. The system of claim 1, wherein the activity-recognition model is further configured to process spatio-temporal features in the image data corresponding to the detected occupants in order to recognize the image-based symptoms of illness.

11. A method for detecting symptoms of occupant illness, the method comprising:
receiving image data from an image source, the image data including a background image associated with an area that occupants are occupying;
executing a human-detection model configured to detect the occupants within the image data;
executing an activity-recognition model configured to recognize image-based symptoms of illness in the detected occupants within the image data based on movements of the detected occupants;
determine a location of the recognized symptoms of illness utilizing the image data from the image source; and
execute a visualization application to display, in a user interface, an overlaid image overlaid onto the background image, the overlaid image including, for each location of recognized symptoms of illness, an indicator displaying information that the recognized symptoms of illness occurred at that location, wherein the overlaid image includes a color-coded heat map that varies in intensity corresponding to a number of recognized symptoms of illness at that location.

12. The method of claim 11, further comprising:
utilizing a convolutional network to extract relevant features from the image data, and sending the extracted relevant features to the activity-recognition model for recognizing the symptoms of illness.

13. The method of claim 11, further comprising:
aggregating the recognized symptoms of illness over time to determine a time-series aggregation, wherein the indicator at each location changes based on the time-series aggregation at that location.

14. The method of claim 11, further comprising:
receiving audio data from an audio source;
executing one or more models to determine audible symptoms of illness based on the audio data;
fusing the audible symptoms of illness with the image-based symptoms of illness; and
executing the visualization application based on the fused audible symptoms of illness and the image-based symptoms of illness.

15. The method of claim 14, wherein the fusion of the audible symptoms of illness with the image-based symptoms of illness occurs prior to the execution of the activity-recognition model such that the activity-recognition model is configured to utilize both audible symptoms of illness and image-based symptoms of illness to recognize symptoms of illness in the detected occupants.

16. The method of claim 14, wherein the fusion of the audible symptoms of illness with the image-based symptoms of illness occurs subsequent to the execution of the activity-recognition model and prior to the execution of the visualization application.

17. The method of claim 11, further comprising:
receiving radar data from a radar source;
executing a human-detection model configured to detect the occupants based on the radar data;
executing an activity-recognition model or vital-signs-recognition model configured to recognize radar-based symptoms of illness in the detected occupants based on the radar data;
fusing the recognized radar-based symptoms of illness with the image-based symptoms of illness; and
executing the visualization application based on the fused radar-based symptoms of illness and image-based symptoms of illness.

18. The method of claim 11, wherein the activity-recognition model is further configured to process spatio-temporal features in the image data corresponding to the detected occupants in order to recognize the image-based symptoms of illness.

* * * * *